United States Patent [19]

Gutierrez

[11] Patent Number: 5,187,892
[45] Date of Patent: Feb. 23, 1993

[54] FISHING ROD HOLDER AND STAND

[76] Inventor: Manuel Gutierrez, 1273 Meadow Sweet Rd., Golden, Colo. 80401

[21] Appl. No.: 822,634

[22] Filed: Jan. 17, 1992

Related U.S. Application Data

[63] Continuation-in-part of Ser. No. 649,677, Feb. 1, 1991, Pat. No. 5,088,224.

[51] Int. Cl.$^5$ .......................... A01K 97/10; A45F 3/44
[52] U.S. Cl. .......................................... 43/21.2; 43/17; 248/156
[58] Field of Search .................... 43/21.2, 17; 248/156, 248/125, 188.5, 540, 545

[56] References Cited

U.S. PATENT DOCUMENTS

| | | | |
|---|---|---|---|
| 994,598 | 6/1911 | Martin | 248/188.5 |
| 2,833,500 | 5/1958 | Jones | 248/156 |
| 2,900,153 | 8/1959 | Lazur | 248/156 |
| 3,467,033 | 9/1969 | Sienkiewicz et al. | 248/156 |
| 4,407,089 | 10/1983 | Miller | 43/21.2 |
| 4,455,779 | 6/1984 | Cosic | 43/21.2 |
| 4,581,838 | 4/1986 | Moon | 43/21.2 |
| 5,009,027 | 4/1991 | Lee | 43/21.2 |

FOREIGN PATENT DOCUMENTS

| | | | |
|---|---|---|---|
| 2253454 | 7/1975 | France | 43/21.2 |
| 2227635 | 8/1990 | United Kingdom | 43/21.2 |

Primary Examiner—Richard K. Seidel
Assistant Examiner—Jeanne M. Elpel
Attorney, Agent, or Firm—Dean P. Edmundson

[57] ABSTRACT

A vertically adjustable stand for supporting a fishing rod holder. The stand including an elongated strip member and two elongated leg members. The elongated strip member having a top ledge and a bottom lip. The leg members slidably received in openings in the bottom lip. A movement sensitive alarm in combination with a vertically adjustable stand.

5 Claims, 12 Drawing Sheets

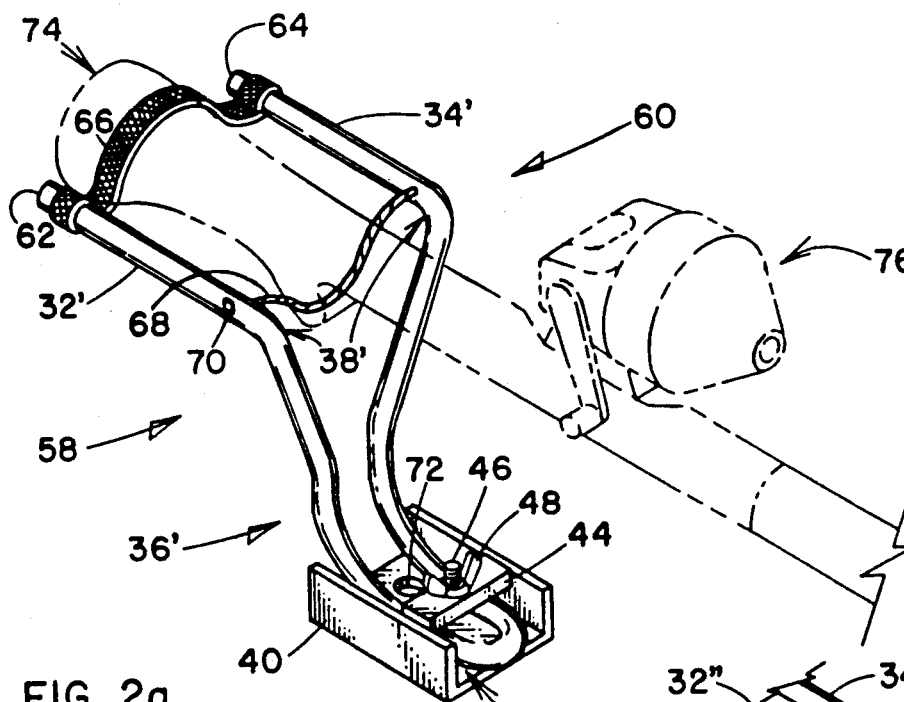
FIG. 2a
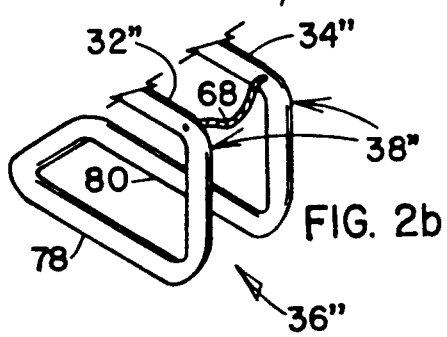
FIG. 2b
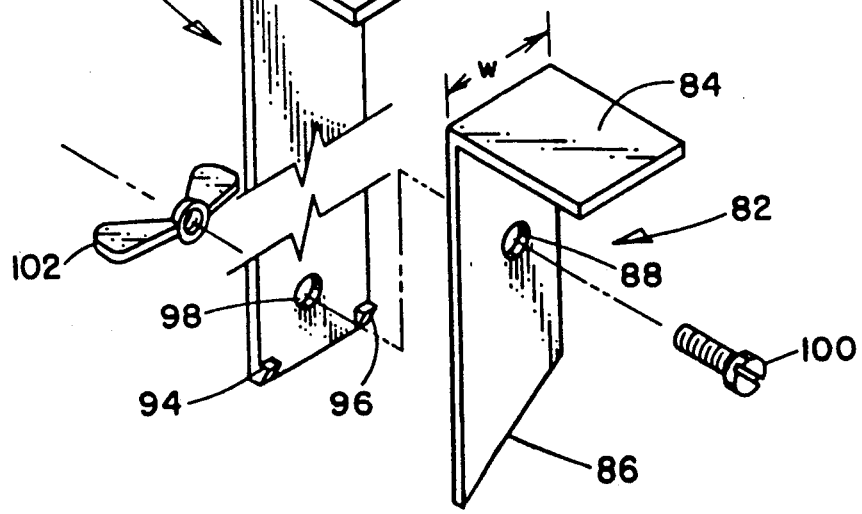

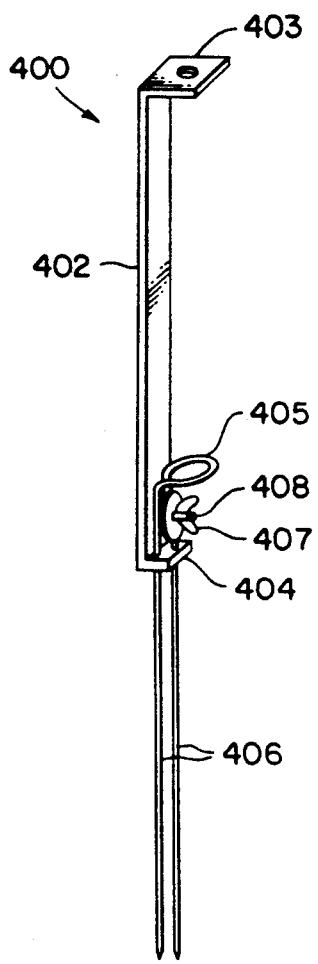
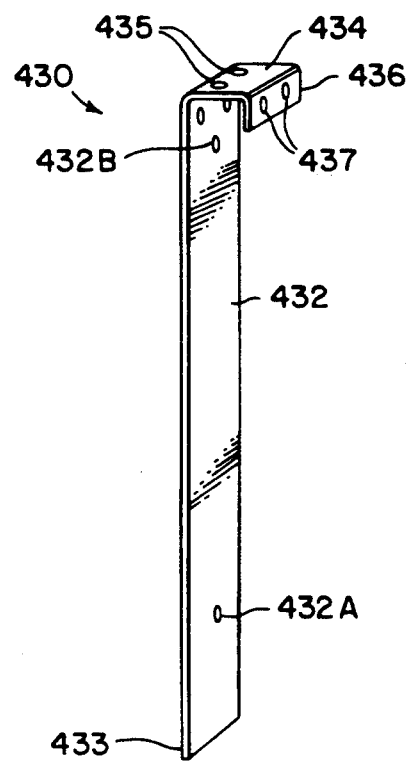
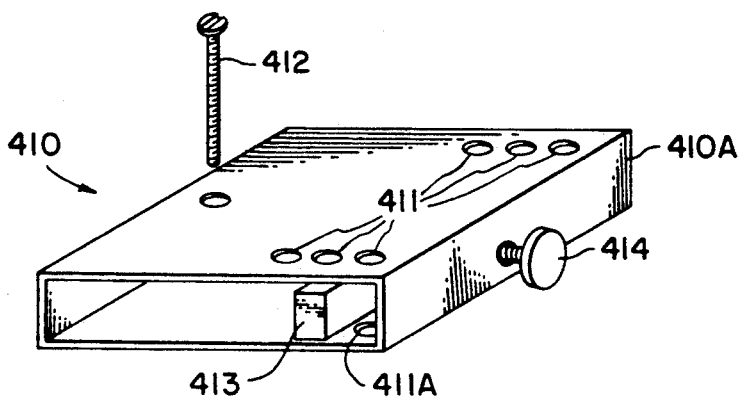
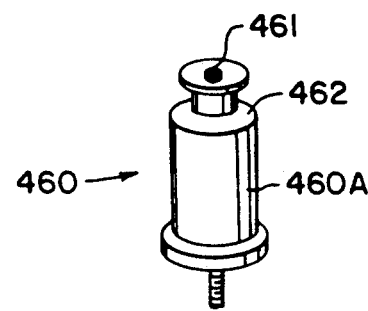

FISHING ROD HOLDER AND STAND

CROSS-REFERENCE TO RELATED APPLICATION

There is a continuation-in-part of my copending application Ser. No. 07/649,677, filed Feb. 1, 1991 now U.S. Pat. No. 5,088,224.

BACKGROUND OF THE INVENTION

In general, this invention relates to devices for holding the end portions of cylindrical tubes and rods as well as portable stands capable of supporting such devices. More particularly, this invention relates to lightweight (a) fishing rod holders with one or more of the following: an auto-hold-and-release mechanism, cable rod supports, a horizontal tilt-adjust mechanism, and a swivel strike indicator, and (b) folding stands for supporting a load such as a fishing rod holder.

U.S. Pat. Nos. 3,570,793 issued to Shackel on Mar. 16, 1971; 2,573,635 issued to Williams on Oct. 30, 1951; 3,837,109 issued to DeJulio on Sep. 24, 1974; and 4,674,222 issued to Hughes on Jun. 23, 1987; 1,534,642 issued to Hoagland on Apr. 21, 1925; 2,553,231 issued to Bayto on May 15, 1951; 2,926,874 issued to Hahn on Mar. 1, 1960; and 567,084 issued to Eicher on Sep. 1, 1896 each disclose fishing rod support devices having fore and aft braces for rod handles. These devices are complex, unstable, or awkward to use. Shackel, Williams, Hoagland, Bayto, Hahn, and Eicher each disclose various attitude adjustment mechanisms. The TITE-LOK ® series 610 and 630 Rod Holders are upwardly open U-frames having an open-V at one end and a loop formed with the other end. Since the mounting brackets of the TITE-LOK ® Rod Holders cannot swivel, fishing rods held by these Rod Holders pull out of the open-V when either (a) a quick lateral or downward force is applied to the fishing line, such as that exerted by a strike, or (b) a more sustained lateral force is applied to the fishing rod held by the TITE-LOK ® Rod Holder.

None of the known rod holders are designed with a hold-and-release mechanism which allows an individual to, with a single hand, position a fishing rod therein and later release it. None of the known rod holders have a swivel strike indicator to minimize the risk of losing a fishing rod held thereby when a fish strikes a line, or when other quick lateral forces are applied to the fishing rod. No known self-supporting stands have the stability that the instant invention displays, and none are as compact and as easy to transport.

SUMMARY OF THE INVENTION

It is a primary object of this invention to provide a relatively lightweight and easy to use device that can effectively support and hold the end portions of cylindrical tubes and rods such as fishing rod handles. It is also a primary object of this invention to provide a portable folding stand for supporting a load such as a fishing rod holder. It is a further object of this invention to provide various types of support stands and mounting devices for supporting fishing rods. Still another object is to provide a fishing rod holder which includes an alarm system to signal a strike on the fishing line by a fish.

The advantages of providing devices as described herein are: (a) versatility—many fishing rod handle shapes and sizes can be accommodated; (b) the hold-and-release mechanism as designed more tightly grips a rod handle as greater force is exerted on it; (c) both the hold- and-release mechanism and the swivel strike indicator, independently and together, minimize the risk of losing a rod when a fish strikes a line or the rod is accidentally bumped; and (d) the simplicity of the holder and stand designs make them easy to operate and fabricate.

Briefly described, in one embodiment the invention includes a holder for a fishing rod that has a rearward rod handle support, a forward rod handle support, and a frame upon which the supports are mounted. The forward rod handle support has a first and second finger mounted for pivotal movement of their tips in unison toward each other when a downward force is applied to a cable connecting the bottom end portions of the fingers. The fishing rod holder comprises an integral steel rod which includes two downwardly depending legs which can be slidingly received in any of a variety of supports described herein. The versatile holders described herein can be mounted to a folding stand of the invention, the edge of a boat, or any other portable or fixed support device in a number of manners.

Folding stands of the invention include in one embodiment: (a) a bottom strip member with a foot ledge and a spiked lower end, and a top strip member with a mounting ledge and at least two projections at its bottom end, the bottom and top strip members coupled for folding thereat; and (b) an L-bracket, a vertical support member pivotally engaged in locking fashion with the vertical portion of the L-bracket, a pivot rod through the vertical portion and at least a portion of the vertical support member, and a first, second, and third extension support coupled with the horizontal portion of the L-bracket for folding thereat.

Other stands and support devices are also described which enable fishing rod holders to be mounted and supported in a variety of manners.

BRIEF DESCRIPTION OF THE DRAWINGS

The invention will be more particularly described by referencing the accompanying drawings of the preferred embodiments, in which like numerals designate like parts.

FIG. 2a is an isometric pictorial of another preferred holder and an exploded isometric view of a preferred folding stand of the invention.

FIG. 2b is a partial pictorial of an alternative holder frame of the invention.

FIG. 3b is a front elevational view of the holder shown in FIG. 3a.

FIG. 3c is a left hand side elevational view of the holder shown in FIG. 3a.

FIG. 4b illustrates the frame of the holder shown in FIG. 4a.

FIG. 9b is an enlarged, partial sectional view of the sand of FIG. 9a.

FIG. 10 is a perspective view illustrating one embodiment of a portable and vertically adjustable stand of the invention.

FIG. 11 is a perspective view of another embodiment of a portable stand of the invention.

FIG. 12 is a perspective view of one embodiment of mounting block which is useful in this invention.

FIG. 13 is a perspective view of another embodiment of mounting member which may be useful on the stands of this invention.

DETAILED DESCRIPTION OF THE PREFERRED EMBODIMENTS

Figure 1:
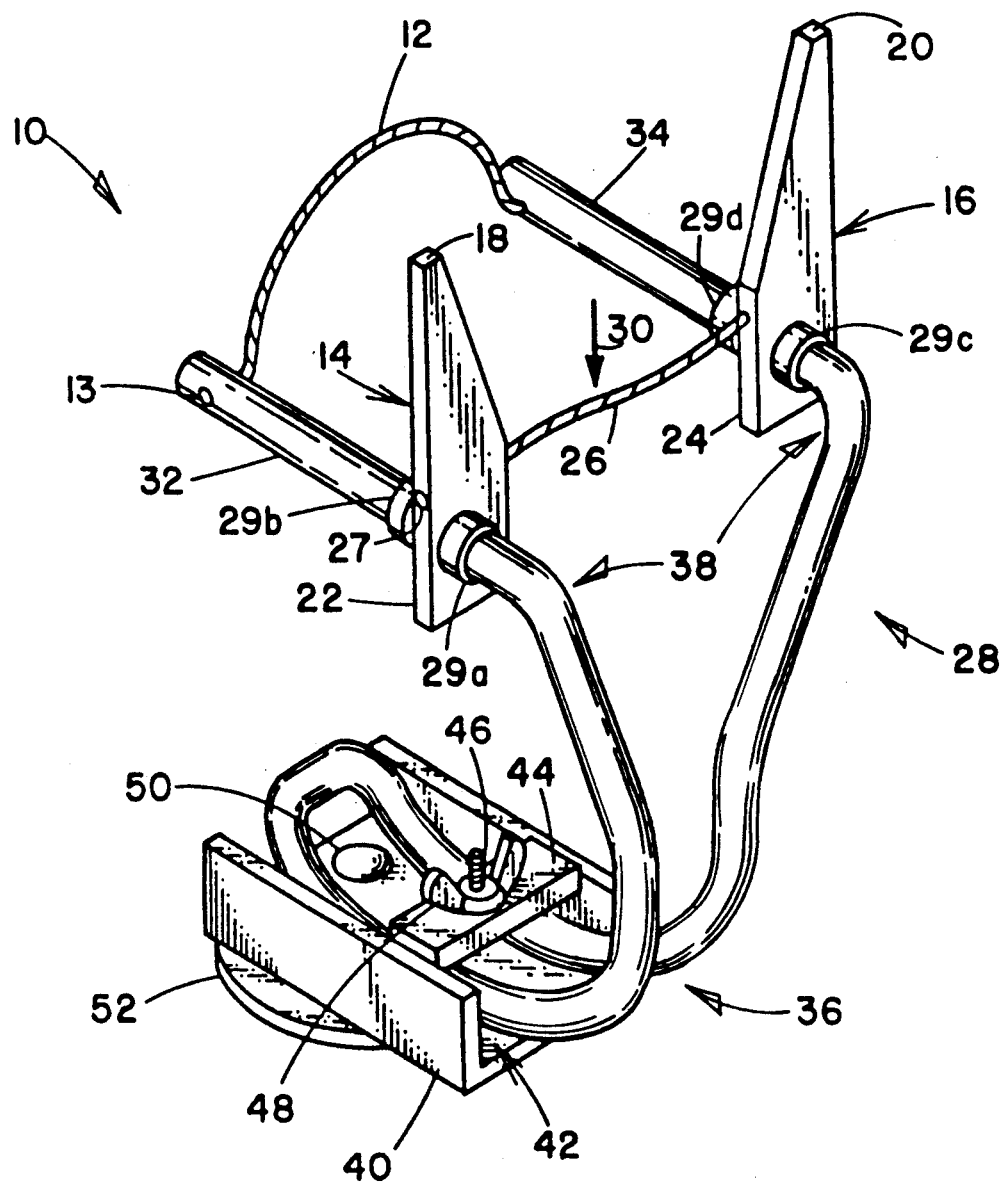
FIG. 1 is an isometric pictorial of a preferred holder of the invention.

Shown at 10 of FIG. 1 is a preferred holder with: a frame 28 having a pair of rails 32, 34, curved rail end portion 36 which extends downwardly and back under the rails to form a C-shape, and bent rail section 38; a rearward rod handle support in the form of a cable 12 with one end secured to rail 32 and the other end secured to rail 34; and a forward rod handle support in the form of fingers 14, 16 connected between their bottom end portions 22, 24 by cable 26 and mounted for pivotal movement of tips 18, 20 in unison toward each other when a force along the direction indicated by arrow 30 is applied to cable 26.

Cables 12, 26 can be secured using any suitable means such as drilling a small hole through the rails 32, 34 or fingers 14, 16, inserting the cable ends therethrough, and soldering the tips of the cables to form beads 13, 27. Although not shown, wrapping the cable completely around a rail or finger and twisting the leading end back around the cable or pinching or clamping the ends of the cables are other ways cables 12 or 26 may be secured. Cables 12, 26 can be made of single or multiple strands or could be multiple link chains. The strands of a multiple strand cable could be woven or twisted, flat or circular cylindrical. Suitable sturdy cable materials include galvanized metals or alloys, nylon, reinforced plastic, fibers, or leather. The cables can be coated with an elastomeric material, or encased within vinyl or other flexible tubing or a mechanical spring, to protect a rod handle within the holder from damage.

Figure 8:
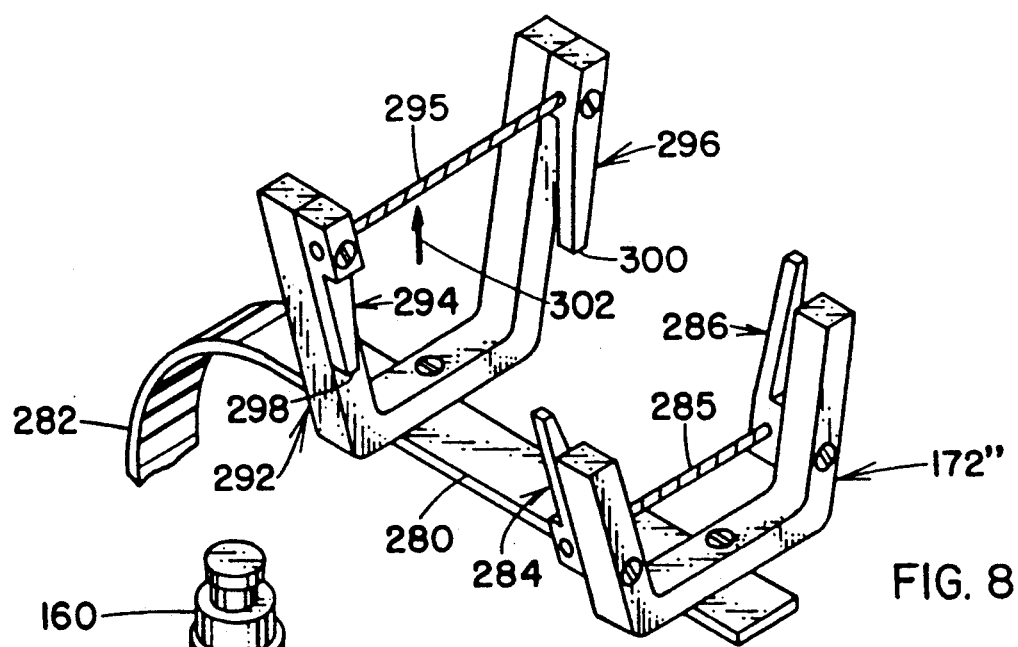

Cable 12 can be interchanged with a second set of fingers (not shown) pivotally mounted on rails 32, 34 and oriented like fingers 294, 296 of FIG. 8 so that they move in unison toward each other when an upward force is applied to a cable connecting the fingers.

Frame 28 can be made from metal, alloy, thermoplastic or thermosetting resin, or any other suitable formable material with some elasticity capable of providing sufficient support, in the form of rod, bar, or tubing of varying cross-sections. Fingers 14, 16 can be metal, alloy, fiberglass, a thermoplastic or thermosetting resin, an elastomer or other suitable materials exhibiting sufficient rigidity to generally hold a shape while supporting a fishing rod handle.

Fingers 14, 16 can be mounted so that tips 18, 20 are located in offset spaced relationship to one another. This prevents them from colliding if rod handles with relatively small diameters are placed in the holder. FIG. 1 illustrates finger 16 mounted further forward at least a distance equal to the thickness of finger 14 to prevent the collision of tips 18, 20. Fingers 14, 16 are held in place by vinyl tubing pieces 29a, 29b, 29c, 29d. Fingers 14, 16 and these vinyl tubing pieces are mounted on rails 32, 34 in a manner that allows one to adjust the location on the fingers with relative ease. This provides holder 10 with a means of accommodating handles of varying length.

Curved rail end portion 36 fits into groove 42 of mounting block 40 so that positioning bar 44, threaded bolt 46, and wing nut 48 can secure curved rail end portion 36 into place. This collection of components, or horizontal tilt-adjust mechanism, provides a means for adjusting the attitude of a rod in holder 10. Bolt 50 through mounting block 40 and washer 52, can be used with a nut (beneath washer 52) for swivel engagement of holder 10 to any portable or fished supporting device. This collection of components can operate as a swivel strike indicator to alert to an individual of a fish strike by allowing a rod held by rod holder 10 to rotate about bolt 50.

Holder 60 of FIG. 2a has a frame 58 with a pair of rails 32', 34', a curved rail end portion 36' which extends downwardly and out away from rails 32', 34' to form a J-shape, and a bent rail section 38' therebetween. Rearward cable 66 is shown as a flat, woven multiple strand cable : it can be any of the alternatives mentioned above for cables 12, 26. The ends of cable 66 have each been wrapped around rails 32', 34' nearby rearward rail ends 62, 64 and soldered back against the cable. In a manner similar to cable 12 of FIG. 1, the ends of cable 68 have been secured to rails 32', 34' to produce solder beads 70 (the other is behind rail 34'). Rod handle 74 with its reel 76 (both shown in phantom) have been positioned in holder 60.

One can appreciate the flexibility of holder 60 as designed by recognizing that the holder can be given a 180 degree turn so that cable 66 is forward and cable 68 is rearward—rod handle 74 remaining pointed in the direction shown. If holder 60 is turned 180 degrees, cable 66 can be "flipped" to form an under-arc and cable 68 can be "flipped" to form a bridge-arc to hold handle 74. Furthermore, it may be desirable to shift the location of cable 66 to accommodate handles of varying lengths. The means shown in FIG. 2a of securing cable 66 allows one to easily adjust its distance from cable 68.

Like FIG. 1, FIG. 2a illustrates curved rail end portion 36' in groove 42 of mounting block 40 so that positioning bar 44, threaded bolt 46, and wing nut 48 can secure curved rail end portion 36' into place. This collection of components operates as a tilt-adjust mechanism. Bolt 110 through hole 72 of mounting block 40 and hole 108 of washer 106, can be used with a nut (not shown) for swivel engagement of holder 60 to the folding stand illustrated in exploded view. This collection of components can operate as a swivel strike indicator by allowing rod handle 74 held by holder 60 to rotate about bolt 110 alerting an individual of a fish strike and aiding in setting the hook.

The stand in FIG. 2a includes a bottom strip member 82, the upper end of which has a width w, and a top strip member 90. Bottom strip 82 has a ledge 84, a hole 88, and spiked lower end 86. Top strip 90 has a ledge 92 with hole 104 therethrough and projections 94, 96 located a distance apart greater than width w so that bottom strip 82 can be locked into place once nut 102 is tightened against bolt 100 through holes 88, 98. The spiked lower end 86 of bottom strip 82 is inserted into the ground by pushing on ledge 84.

The frame of FIG. 2b has: a pair of rails 32'', 34''; a curved rail end portion 36'' which extends downwardly and back under rails 32'', 34'' to form an L-shape having legs 78, 80; and bent rail section 38'' between rails 32'', 34'' and curved rail end portion 36''. This frame can be interchanged with those in FIGS. 1, 2a, 3a, 4a, and 7 to fit with either mounting block 40 in FIGS. 1 and 2a, cylindrical vertical support member 144 in FIGS. 3a and 4a, or curved strip member 240 in FIG. 7. Suitable frame materials include those mentioned above for the frame 28 of FIG. 1.

Figure 3A:
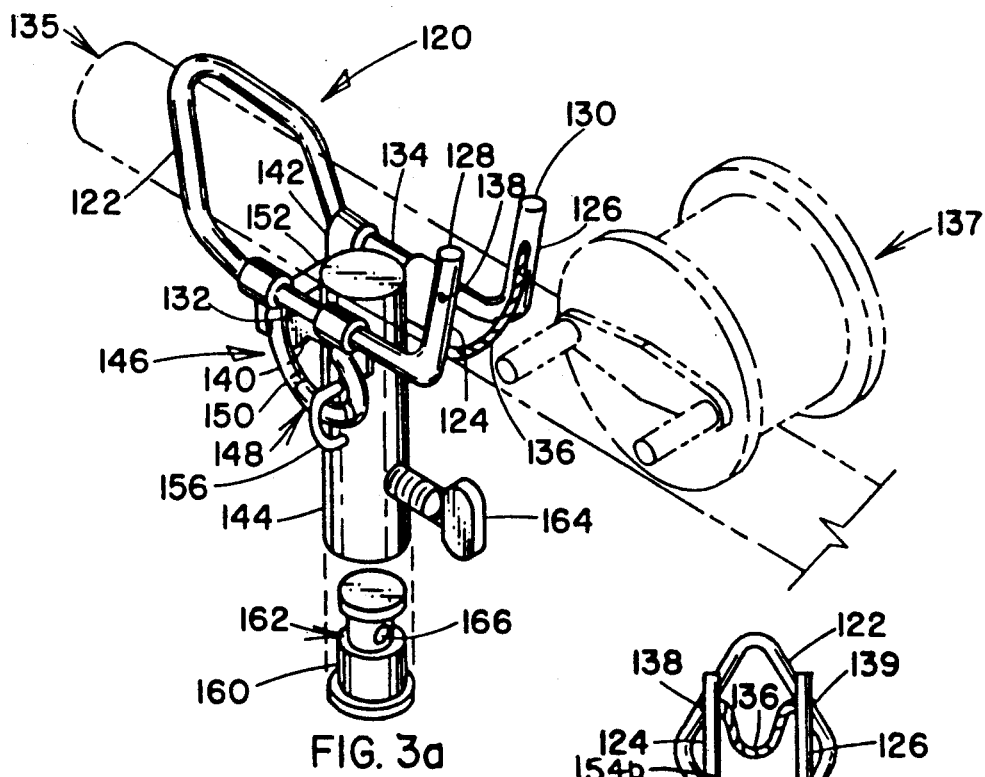
FIG. 3a is an isometric pictorial of a further preferred holder of the invention illustrating (in phantom) a fishing rod handle and reel positioned in the holder.
Figure 3B:
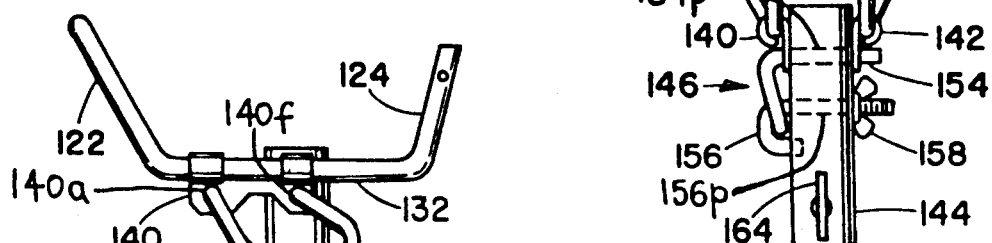

FIG. 3a illustrates frame 120 having a rearward rod handle support loop 122, a forward upwardly extending pair of rails 124, 126 with forward rail ends 128, 130, and a central double rail portion 132, 134. The ends of cable 136 have been secured to rails 124, 126 in a manner similar to cables 12, 26 of FIG. 1 to produce beads 138 (and 139 of FIG. 3b). Cable alternatives are as discussed above for FIG. 1. Mounting brackets 140, 142 each have a fore-aperture such as 140f and an aft-aperture such as 140a through which the bent rods 152 (and 154 shown in FIGS. 3b and 3d) of tilt-adjust member 146, extend. Fore-aperture 140f and aft-aperture 140a are labelled on mounting bracket 140 of FIG. 3c. FIG. 3b illustrates how bent rod 154 extends through the fore-apertures of both mounting brackets 140, 142. Flaps (not labelled) on mounting brackets 140, 142 wrap around to receive rails 132, 134 (also shown in FIG. 3b). Central curvature 148 of member 146 can have location set undercuts 150 to aid in locating partially threaded J-bolt 156 against the central curvature to set the attitude of rod handle 135 and reel 137 (shown in phantom). Tilt-adjust member 146 as shown has an attitude adjustment range of approximately 110 degrees: this can be modified to cover other desired ranges by modifying the shape of central curvature 148.

Cylindrical vertical support member 144 has a threaded passage for threaded bolt 164 which can fit within annular recess 162 of circular cylindrical mounting block 160 when the mounting block 160 is inserted into the bottom end of vertical support member 144. Vertical support member 144 is shown as a circular cylinder, however, it is only critical that the lower portion which receives mounting block 160 be circular cylindrical so that the mechanism can operate as a swivel strike indicator. Annular recess 162 in operation with bolt 164, allow 360 degree rotation of holder 120 without risk of having vertical support member 144 pull up and off the mounting block 160. Socket 166 can receive the end of bolt 164 to lock the position of the holder in place, if desired. Frame 120 and tilt-adjust member 146 can be made of materials similar to those suggested for frame 28 of FIG. 1.

Turning to FIG. 3b, cylindrical vertical support member 144 has an upper passage (at 154p as hidden lines) through which bent rod 154 extends and a lower passage (at 156p as hidden lines) through which J-bolt 156 extends. Wing nut 158 serves to hold J-bolt 156 against tilt-adjust member 146. This front view of the holder in FIG. 3a better illustrates how mounting brackets 140, 142 are coupled to rails 132, 134.

Figure 3C:
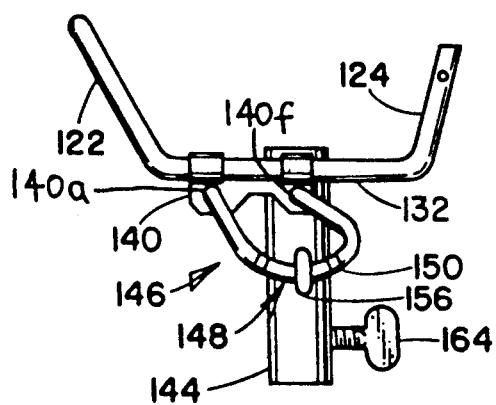

The left hand side view in FIG. 3c merely helps identify the location of the above-mentioned components.

Figure 3D:
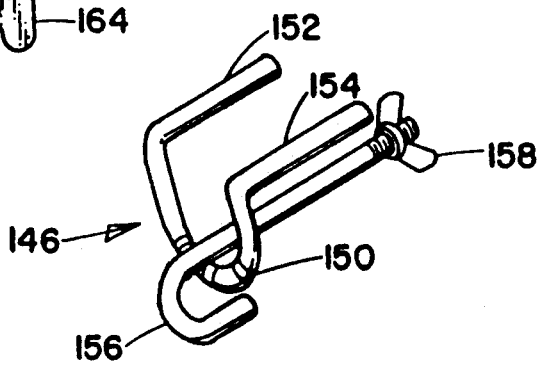
FIG. 3d illustrates the tilt-adjust member and J-bolt of the holder shown in FIGS. 3a, 3b, and 3c.

FIG. 3d illustrates the tilt-adjust member 146 (with its bent rods 152, 154) and J-bolt 156 as they operate together.

Figure 4A:
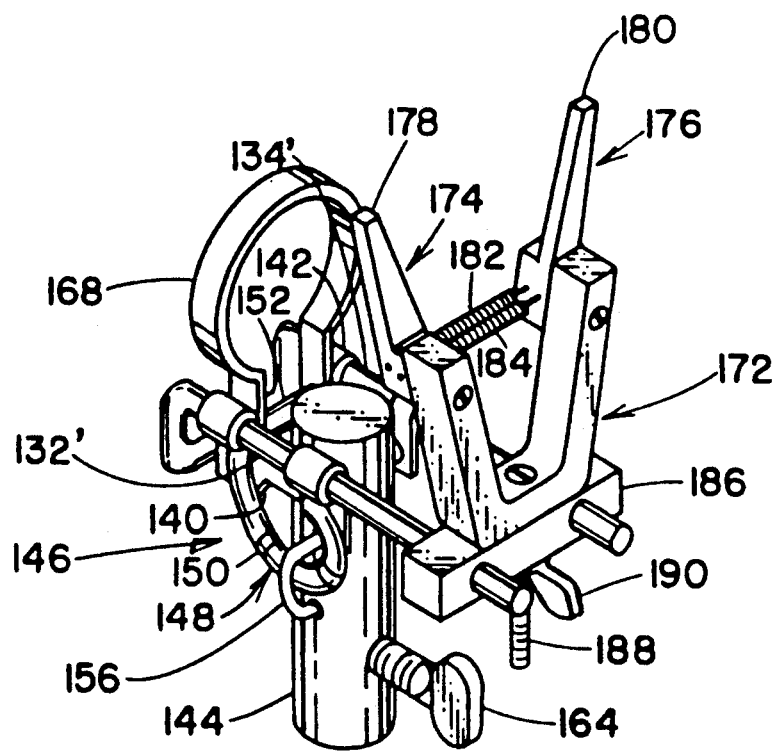
FIG. 4a is an isometric pictorial of another preferred holder of the invention.

The frame in FIG. 4a has a pair of rails 132', 134' and a forward two-prong forked mount 172 coupled to the rails by way of bracket 186, bolt 188, and nut 190. The bracket 186 can be made of metal, alloy, molded plastic, or other suitable materials. As an alternative for strength, rails 132', 134', bracket 186, and mounting brackets 140, 142 can be incorporated into a single planar-topped frame with sidewalls located where brackets 140, 142 are positioned. Fingers 174, 176, each pivotally mounted to a prong of forked mount 172, have tips 178, 180 which will move in unison toward each other when a downward force is applied to the cables (not labelled) encased by mechanical springs 182, 184. Vinyl or other suitable tubing, or an elastomeric coating, could replace springs 182, 184. Fingers 174, 176 have been designed so that tips 178, 180 are located in offset spaced relationship to one another for the reason stated above in relation to finger tips 18, 20 shown in FIG. 1. Suitable materials for fingers 174, 176 are the same as those mentioned above for fingers 14, 16 of FIG. 1.

Figure 4B:
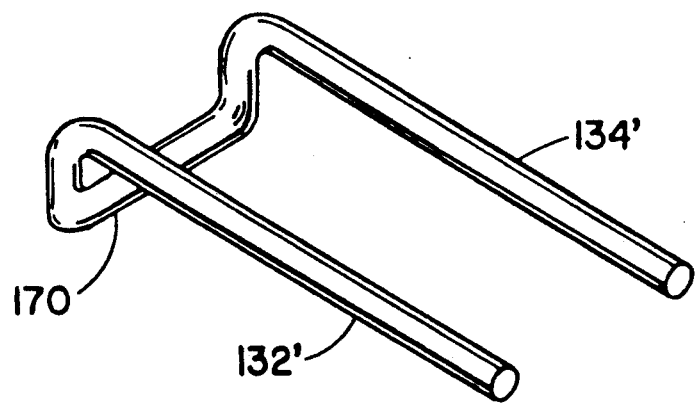

Frame section 170 (labelled in FIG. 4b) acts as a stop for collar 168, hinged to bent rail 152 of tilt-adjust member 146, should the collar be swung too far back. Mounting brackets 140, 142 are coupled to rails 132', 134' and tilt-adjust member 146 operates with J-bolt 156 and cylindrical vertical support member 144 (see also FIGS. 3a, 3b, 3c, and 3d for similar components). Rails 132', 134', section 170, collar 168, and forked mount 172 can be made from materials as mentioned above for frame 28 of FIG. 1.

Figure 5A:
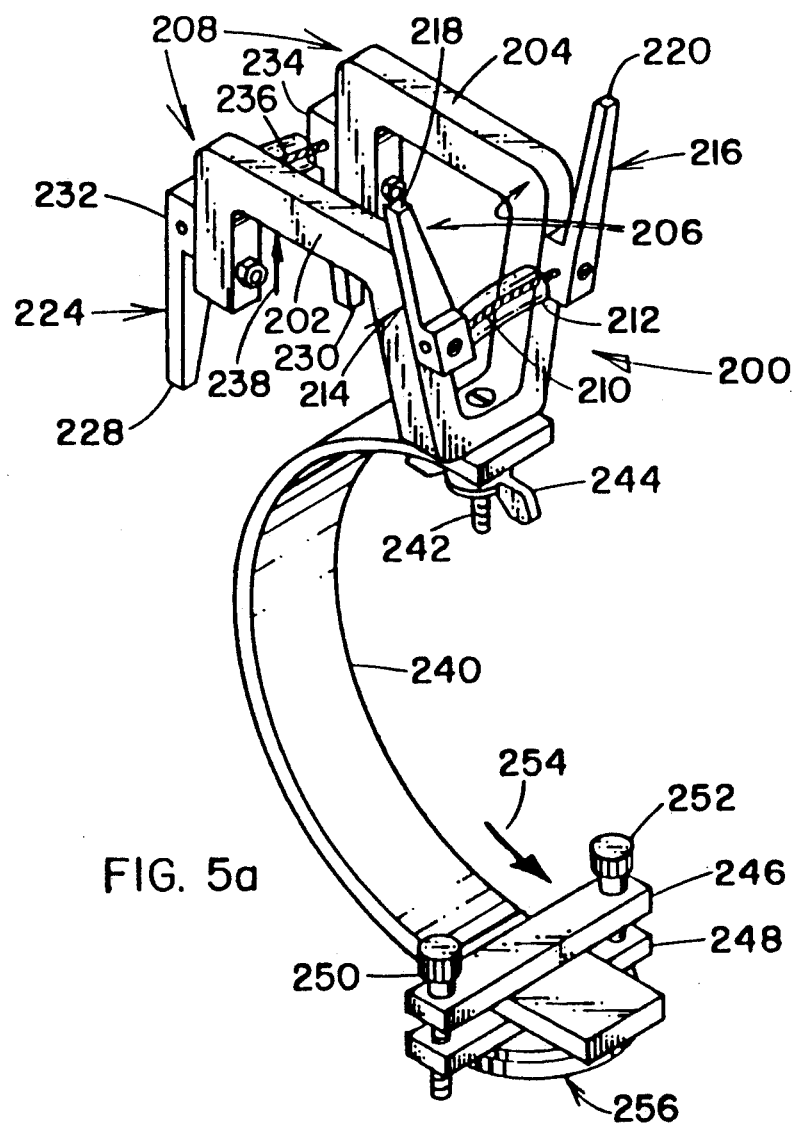
FIG. 5a is an isometric pictorial of another preferred holder of the invention illustrating a curves trip member in the shape of a "C" mounted to operate as a holder tilt adjustment.
Figure 5B:
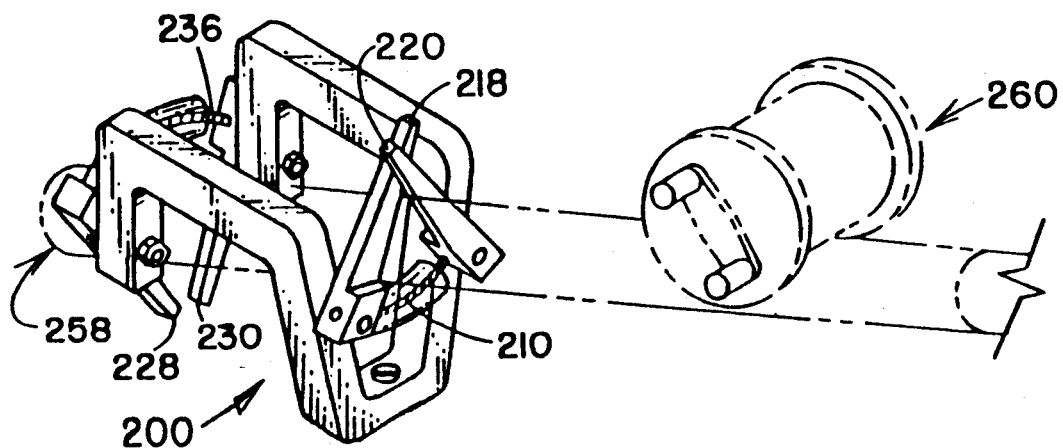
FIG. 5b illustrates the holder shown in FIG. 5a with a fishing rod handle and reel (in phantom) positioned in the holder.

Frame 200 of FIG. 5a is a fork having a pair of rails 202, 204 between a forward bent rail section 206 and a rearward bent rail section 208. Although illustrated as a single bar, frame 200 can be made from materials similar to those mentioned above for frame 28 in FIG. 1. A stronger frame 200 material and thicker cross-section may be desired if the holder of FIG. 5a is used to support a deep sea fishing rod or a pole holding a lantern at the end. Fingers 214, 216, designed like fingers 174, 176 of FIG. 4a, are each pivotally mounted to one prong of fork frame 200 for movement of tips 218, 220 toward each other when a downward force is applied to cable 210 encased by clear tubing 212. The bottom end portions 232, 234 of an additional set of fingers 224 (and the other not labelled) are connected by cable 236 (also encased by clear tubing, not labelled) so that tips 228, 230 move toward one another when an upward force in the direction indicated by arrow 238 is applied to cable 236. The movement of tips 218, 220 and 228, 230 can best be understood by viewing FIG. 5b illustrating rod handle 258 with reel 260 (in phantom) positioned in the holder frame 200.

Frame 200 of FIG. 5a has been mounted securely to curved strip member 240, shown here in the shape of a "C", by way of threaded bolt 242 and nut 244. Suitable materials for curved strip member 240 include metals, alloys, resins, or other materials capable of taking on a desired curvature and capable of providing sufficient strength. Sandwiched between brackets 246, 248 is the bottom end of curved strip member 240. Bracket 248 and washers 256 (which can be one or more washers) are secured to a stand (not shown) by way of a bolt (not seen) for swivel engagement of the bottom end with the stand: this can serve as a swivel strike indicator. Curved strip member 240 can be moved in the direction indicated by arrow 254 and then positioned by threaded mounting screws or bolts 250, 252 which pinch together brackets 246, 248: this can serve as a tilt-adjust mechanism. Note that brackets 246, 248 can be replaced by a single piece having an opening for the bottom end of curved strip member 240. A set screw centrally located over the curved strip member can be used to position this single alternative bracket.

Figure 6:
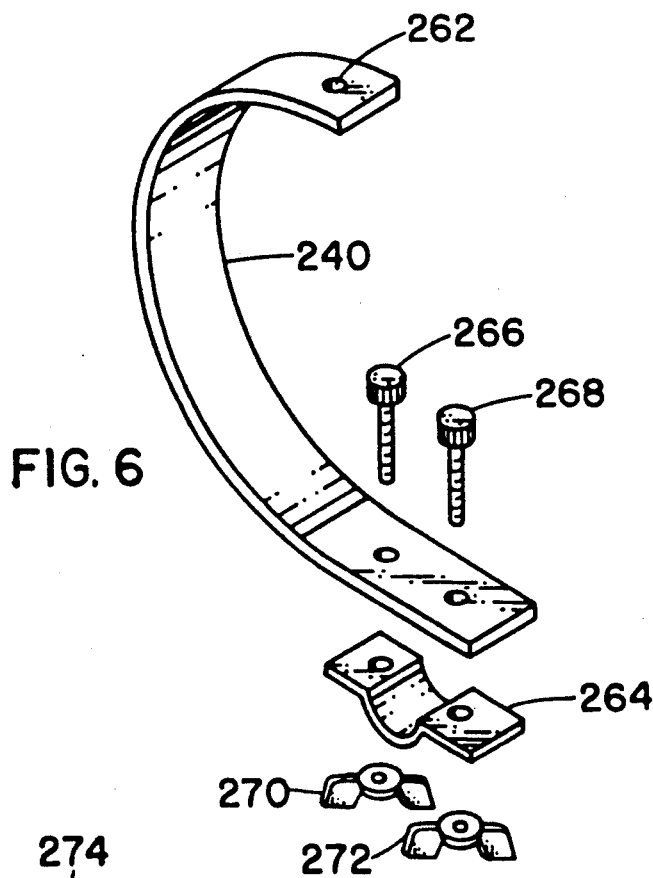
FIG. 6 illustrates the curved "C" strip member of FIG. 5a with a means for mounting the strip member to a rial.

FIG. 6 illustrates curved strip member 240 with a hole 262 at its top end for receiving bolt 242 (of FIG. 5a). Bracket 264 is shaped to sandwich a rail fixed to the side of a boat, for example, between it and the bottom end of curved strip member 240. Threaded bolts 266, 268 operate with nuts 270, 272 to mount the curved strip member 240 to the boat rail.

Figure 7:
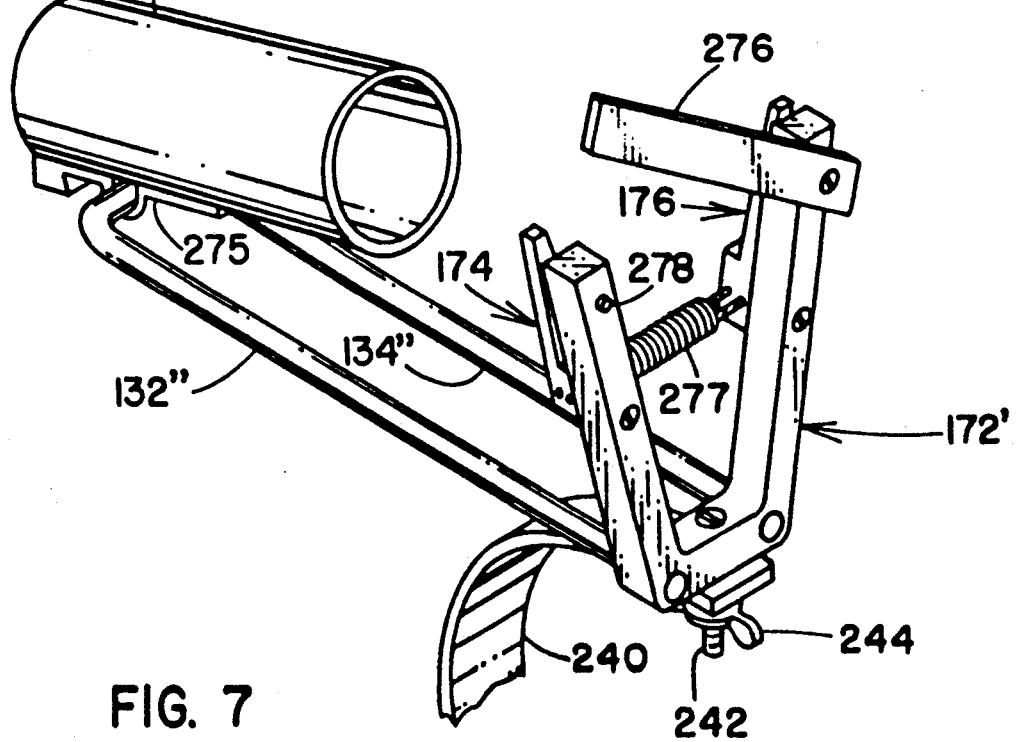
FIGS. 7 and 8 are isometric pictorials of other preferred holders of the invention.

The holder shown in FIG. 7 has a frame with a pair of rails 132", 134" and a forward two-prong forked mount 172' coupled to the rails by way of extending the rails through holes in the forked mount 172'. Fingers 174, 176 are connected by two cables (not labelled) and mounted to forked mount 172' in a manner similar to that shown in FIG. 4a. The two mechanical springs 182, 184 of FIG. 4a have been replaced by a single spring 277. For heavy duty applications of the holder in FIG. 7, hinged cross-bar 276 and stop 278 operate to prevent a rod handle from accidental release. Hinge 275 couples sleeve 274 to the frame. Two-prong forked mount 172' has been mounted securely to curved strip member 240 (shown here in part) by way of threaded bolt 242 and nut 244.

The frame of FIG. 8 has a planar strip member 280 integral with a curved strip section shown in part at 282, which can take the shape of the curved strip member 240 of FIGS. 5a and 6. Two-prong forked mount 172", mounted to planar strip member 280, has fingers 284, 286 pivotally mounted to its prongs. Fingers 284, 286 connected by cable 285 operate in a manner similar to fingers 174, 176 and their connecting cables of FIG. 4a. Two-prong forked mount 292, also mounted to planar strip member 280, has a set of fingers 294, 296 connected by cable 295 so that tips 298, 300 move in unison toward each other when a force along direction arrow 302 is applied to cable 295. Again, the tips of fingers 284, 286 and fingers 294, 296 are located in offset spaced relationship.

Figure 9A:
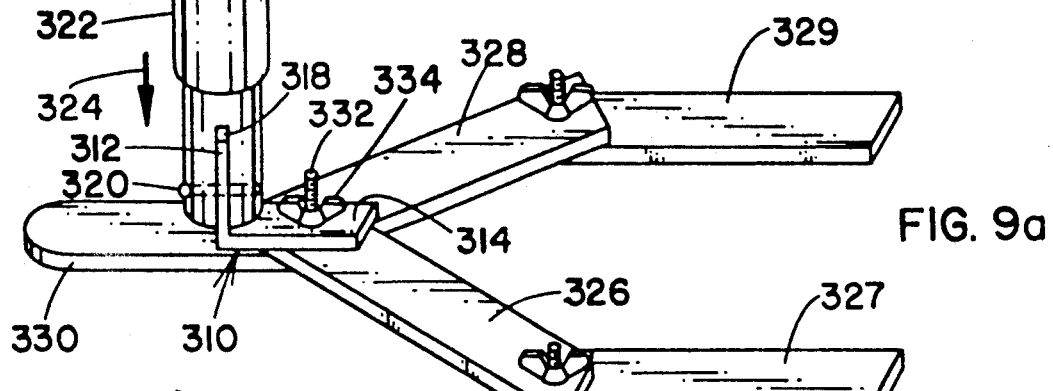
FIG. 9a is an isometric pictorial of another preferred folding stand of the invention.
Figure 9B:
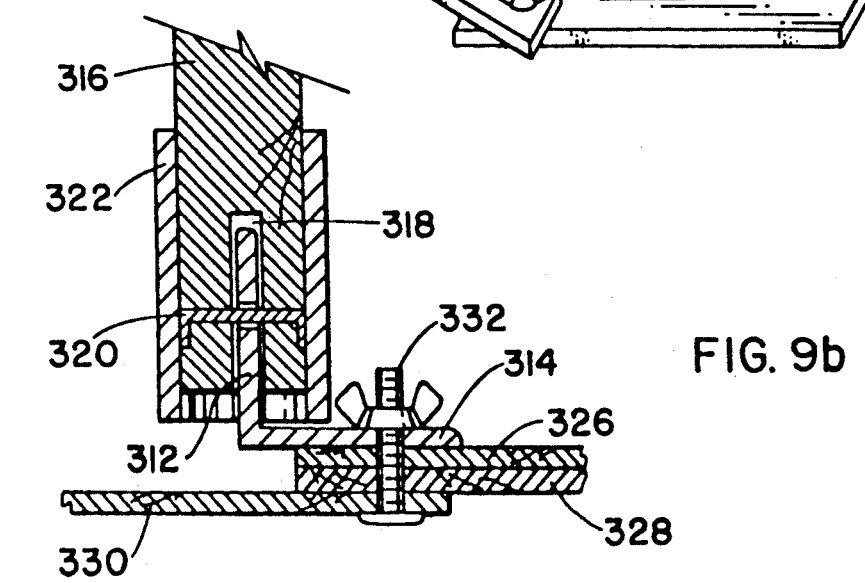

The folding stand in FIG. 9a has an L-bracket 310 with a vertical portion 312 and a horizontal portion 314. Vertical support member 316 has a slot 318 therethrough for receiving vertical portion 312. One can interchange both the vertical support member 316 and sleeve 322, with top strip 90 of FIG. 2a. To do this, one would pivotally engage the top strip in locking fashion with L-bracket 310 in a manner similar to the way top and bottom strips 90, 82 engage. Hidden lines indicate where pin 320 is located for pivotal movement of vertical support member 316 to form a fold joint for the stand. Sleeve 322 can be slid along the direction indicated by arrow 324 positioned (as shown in FIG. 9b) around the lower end of vertical support member 316 to "lock" the vertical support member in place. If top strip 90 of FIG. 2a is interchanged as above-mentioned, this strip-shaped vertical support member would use its projections 93, 96 to "lock" the member in place once a securing means such as a bolt and nut have been tightened. Mounted to the top of vertical support member 316 is circular cylindrical mounting block 160, although any mounting blocks or brackets shown herein may be used. First, second, and third extension supports 326, 328, 330 have been coupled with horizontal portion 314 by way of bolt 332 and nut 334 to allow the extension supports to fold together for easy transport of the stand. Extra extensions 327, 329 can be coupled to extension supports 326, 328 respectively if further lateral support is desired.

The enlarged, partial sectional view of FIG. 9b illustrates slot 318 with vertical portion 312 and pin 320 therethrough. Pin 320 can be fed through holes in both vertical support member 316 and vertical portion 312, as a straight member and then bent or hammered at each end to produce stops/heads at each end. If vertical support member 316 is wood (as cross-hatched), pin 320 can be embedded (as shown) in the support member 316 to provide clearance for movement of sleeve 322. Vertical support member 316 and extension supports 326, 328, 330 are shown to be made from wood, however, many suitable, sturdy materials may be used such as metal, alloy, or plastics.

By way of example only, holder was constructed similar to that shown in FIG. 1 with a frame 10 of ¼ inch diameter 6061 aluminum rod (cut to about 17 inches in length) having holes drilled therethrough for the ends of a 1/16 inch diameter galvanized aircraft cable cut to about 2.5 inches. The cable ends were soldered once threaded through the holes. Fingers 14, 16 were shaped from ⅛ inch thick 6061-t6 aluminum bar and 5/16 inch holes were drilled for cable 26 (cut to about 2.5 inches) to fit through. The ends of cable 26 were also soldered after insertion into the holes drilled therefor. The aluminum mounting block 40 is approximately 1.5 inches in length. Positioning bar 44 is 3/16"×⅜"×1" aluminum or plastic bar. Washer 52 has a diameter of ⅜ inch.

By way of a second example, frame 200 (FIG. 5a) and two-prong forked mounts 172 (FIG. 4a), 172' (FIG. 7), 172" and 292 (FIG. 8) were made from ⅜"×⅜" 6061 aluminum bar bent to desired shape.

In FIG. 10 there is shown one embodiment of rod holder stand 400 of the invention comprising an elongated body member or bar 402 having upper end 403 which forms a support or attachment surface for a rod holder. The lower end 404 preferably projects away from the longitudinal axis of the body 402 and includes openings extending therethrough, as illustrated. Leg members or spikes 406 are generally parallel to the body member and are longitudinally adjustable relative to the body member. Bolt 408 (with wing nut 407) extends between legs 406 and through body member 402 to secure the legs in any desired position. The upper ends of the legs are preferably joined together, as shown, and are preferably bent away from body 402 to form a foot ledge 405 to assist in driving legs 406 into the soil and for raising or lowering the legs when the bolt is loosened.

The length of body member 402 and legs 406 may vary, as desired. Preferably the legs are slightly longer than the body member. A length of about 8 to 15 inches normally is sufficient for most purposes.

The flexing action of stand 400 can be easily adjusted by moving the legs 406 upwardly (to reduce amount of flexing) or downwardly (to increase amount of flexing). The flexing action can be used as a fish strike indicator. Also, the rod can be pulled rearwardly while it is in the rod holder by simply flexing the stand rearwardly (e.g., to set the hook when there is a strike on the line).

The lower ends of spikes or legs 406 can be slidably received in various types of supporting blocks or auxilliary stands, for example. Alternatively, the legs can be pushed or driven into the ground to support the stand in an upright manner.

Any suitable types of rod holder may be secured to the upper end of body member 402 for the purpose of supporting and holding a fishing rod. For example, any of the rod holders described herein may be secured to the upper end of the body. One useful type of rod holder connecting means is shown in FIG. 3a and a similar one is shown in FIG. 13. The connecting means in FIG. 13 comprises a mounting block 460 which is secured to the upper end 403 of body 402. Preferably block 460 comprises a circular cylindrical portion 460A and an annular recess 462. Bolt 461 can be used to secure the block to the stand. This type of mounting block is useful in serving as a swivel mount for a rod holder of the type which includes a cylindrical support member (e.g., of the type shown as 144 in FIG. 3a).

Figure 10A:
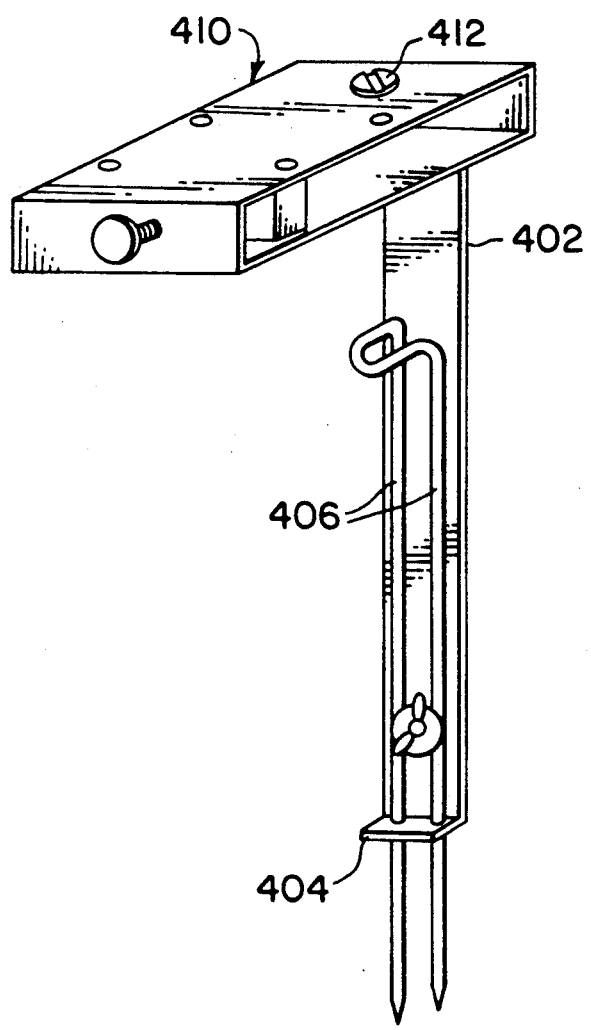
FIG. 10A is a perspective view showing the adjustable stand of FIG. 10 with the mounting block of FIG. 12 attached thereto.

Another type of mounting block 410 which can be secured to the upper end 403 of the stand is shown in FIG. 12. This combination is shown in FIG. 10A. The block is generally rectangular and includes a plurality of apertures 411 which are spaced apart and which extend through the upper portion of the block. A bolt 412 extends vertically through block 410 for the purpose of securing the block to the upper end 403 of stand 400. The base or lower portion of the block includes an aperture 411A therethrough on each of two opposite sides. A rod holder of the type which includes downwardly depending leg members can be detachably supported in block 410. This type of rod holder is shown, for example, in FIG. 17 and is described in more detail hereinafter. The legs of the rod holder can be inserted through two of the apertures 411 (one on each side of block 410) and then through apertures 411A in the base of block 410. Bar 413 extends across the width of block 410 between the upper and lower portions of the block. Bolt 414 threadably engages bar 413. By tightening bolt 414 the bar is drawn against the legs of the rod holder to tightly secure them within the block.

The tilt of the legs of the rod holder relative to the block 410 is determined by which set of apertures 411 are used. For a vertical disposition of the legs relative to the block 410, the legs are inserted through the set of apertures 411 closest to the front edge 410A of the block. To obtain a slight rearward tilt for the rod holder relative to block 410, the legs would be inserted through the second set of apertures 411 and then through lower apertures 411A. To obtain even more tilt, the legs would be inserted through the last set of apertures 411 and then through lower apertures 411A.

FIG. 11 is a perspective view of one embodiment of support stand 430 of the invention comprising elongated shank 432 whose lower end 433 is tapered (e.g., so that the shank can be pushed or driven into the ground). The upper end of the stand includes a ledge or shelf 434 which is preferably perpendicular to the longitudinal axis of the shank 432. The shelf includes spaced apart apertures 435 for slidably receiving the leg members 406 of stand 400 (shown in FIG. 10). Accordingly, support stand 430 is very useful in combination with the stand 400. For example, the tapered end 433 of the stand 430 can be driven into the ground, after which the leg members 406 can be inserted into apertures 435, whereby stand 400 is supported atop stand 430. A rod holder can then be attached to upper end 403 of stand 400.

Another preferred feature of stand 430 is that it can include vertical lip 436 (which is preferably parallel to shank 432). The lip 436 includes spaced apart apertures 437.

Although stand 430 can be used in a vertical position as explained above, it can also be used in a horizontal mode so that the legs 406 of stand 400 can be slidably received in apertures 437 to support the stand 400 vertically. When stand 430 is placed in a horizontal mode it can be weighted down with rocks, for example. It can also be slidingly received in a slot or receiver in the bottom surface of a tackle box, for example. This is a very handy feature which enables the stand to be supported in an upright manner anywhere without having to weight it down with rocks. For example, this embodiment could be used in a boat to support a fishing rod.

Another manner of using stand 430 is to secure it with bolts to a desired support platform or surface. For example, apertures 432A and 432B through shank 432 can accommodate bolts or secrews for securing the shank to a desired support.

Figure 14:
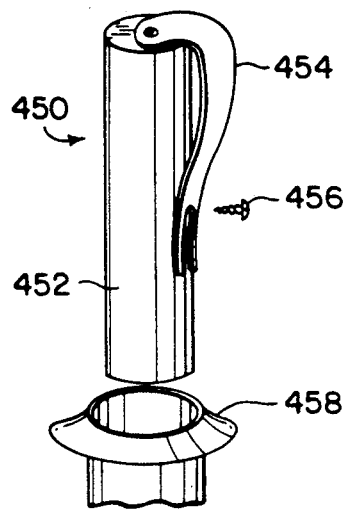
FIG. 14 is a perspective view of another embodiment of portable stand which is useful in this invention.

FIG. 14 is a perspective view illustrating another embodiment of rod holder support 450 comprising an elongated generally cylindrical body 452 and an elongated resilient strip member 454. The upper end of the strip 454 is secured to the upper end of body 452, and the lower end of the strip is adjustably secured to the lower portion of body 452 by means of bolt or screw 456. The lower end of strip 454 includes an elongated slot (or a plurality of longitudinally spaced openings) so that the vertical position of the lower end of strip 454 relative to body 452 can be adjusted. As the vertical position of strip 454 is raised relative to body 452, strip 454 must bow outwardly from body 452. This increases the effective width or diameter of the rod holder support. Any desired type of rod holder can be secured to the upper end of body 452 for holding a fishing rod.

The embodiment of rod holder support shown in FIG. 14 is useful in applications where the support is slidingly received in a tubular holder 458 (e.g., in a boat).

Figure 15:
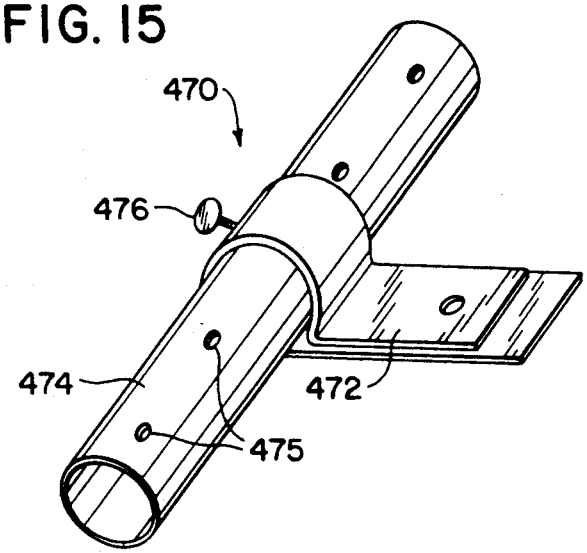
FIG. 15 is a perspective view of another embodiment of mounting member which is useful in this invention.

FIG. 15 is a perspective view of another embodiment of rod holder 470 which comprises clamp 472 and cylindrical body 474 supported in the clamp. The body 474 includes spaced-apart apertures 475 for slidably receiving the downwardly depending leg members of a rod holder of the type shown in FIG. 17. A plurality of apertures 475 can be included to receive more than one rod holder.

By loosening screw 476, body 474 can be rotated relative to the clamp 472. The rod holder 470 can be secured to any desired support surface.

Figure 16:
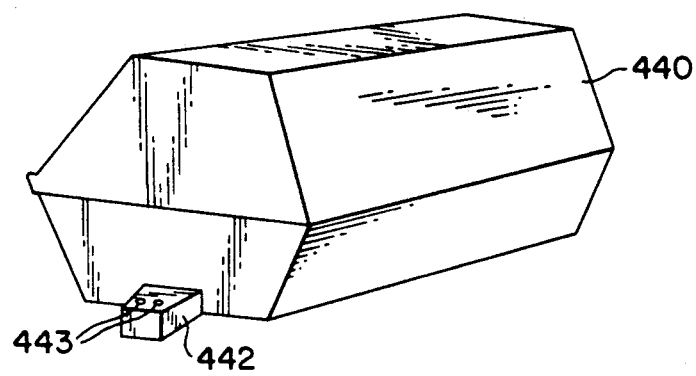
FIG. 16 illustrates another use of a portable stand of this invention.

FIG. 16 illustrates another embodiment of support or stand for supporting a portable stand of the type shown in FIG. 10, for example. A conventional tackle box 440 has secured to one end a block 442 which includes openings 443. The legs or spikes 406 of stand 400 can be received and supported in the openings in the block.

Figure 17:
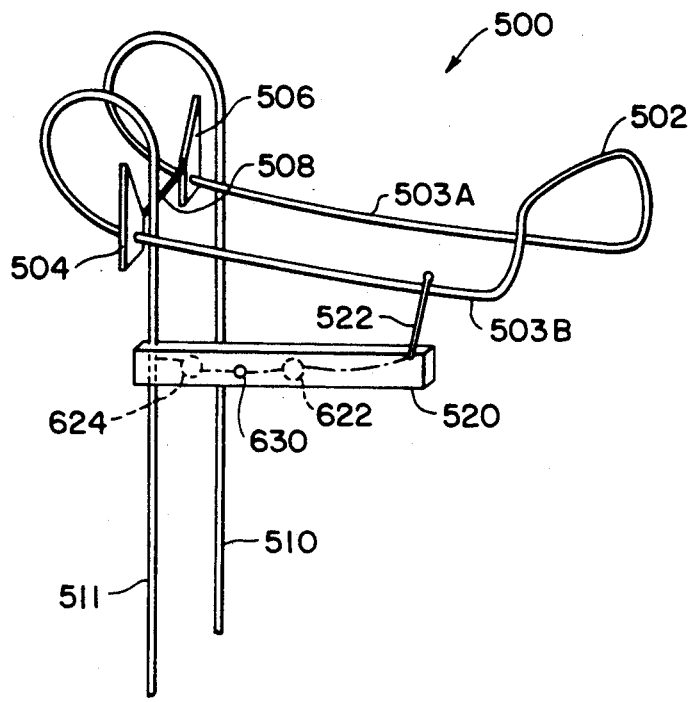
FIG. 17 is a perspective view of another embodiment of rod holder of this invention.

FIG. 17 illustrates an embodiment of rod holder 500 of the invention comprising a rearward rod handle support 502, a forward rod handle support comprising fingers 504 and 506 each having a tip and a bottom end portion, wherein the bottom end portions are connected by at least one cable 508. The fingers are mounted on arm portions 503A and 503B for pivotal movement of the tips in unison toward each other when a downward force is applied to the cable. There are also spaced apart leg members 510 and 511 which extend downwardly (and preferably are parallel to each other). The leg members can be slidably received in and supported by rod holders of the type shown in FIGS. 12 and 15, for example. The rod holder 500 is preferably made of an integral piece or length of small gauge rod (e.g., rod having a diameter of about 0.12 inch). The rod holder 500 includes loops, as illustrated, between the leg portions and the frame portions so as to impart more spring action to the rod holder.

Also included in rod holder 500 is an alarm system comprising a battery 622, a conventional audible signal means 624, a visual signal means 630 (e.g., an LED), a contact arm 522, and appropriate electrical contacts. Preferably the audible signal means comprises a buzzer, beeper or other such audible signal producing device. It is not necessary to include both an audible alarm and a visual alarm but it is preferred to include both (and to connect them in series). The alarm system is carried on arm 520 which is secured at one end to leg member 511. The battery, LED and buzzer are secured to arm 520. The lower end of contact arm 522 is also secured to arm 520. The free end of arm 522 extends upwardly and is positioned in close proximity to arm portion 503B.

Figure 18:
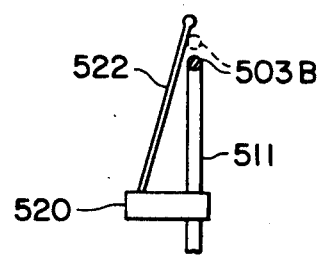
FIG. 18 is a rear elevational view of the embodiment of rod holder shown in FIG. 17.
Figure 19:
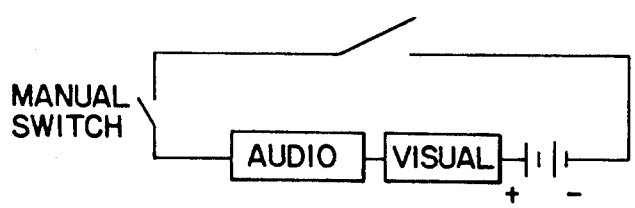
FIG. 19 is a schematic diagram of the audio alarm system which may be used in this invention.

The electrical circuitry of the alarm system is illustrated in the schematic diagram of FIG. 19. When contact arm 522 comes into contact with arm 503B (i.e., when a fish strikes a line carried by a fishing rod supported in the holder and causes leg members 510 and 511 to deflect slightly forward and rearward portion of arm 503B to deflect slightly upward), the electrical circuit is completed and the buzzer and the LED are activated. This is also illustrated in the elevational view of FIG. 18.

Figure 20:
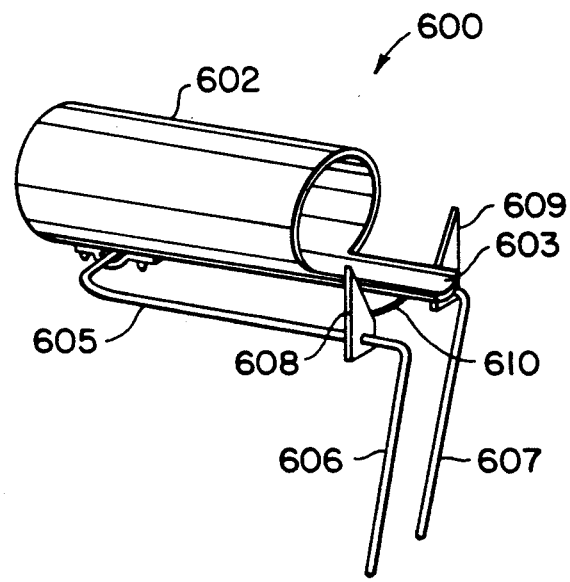
FIG. 20 is a perspective of another embodiment of rod holder of this invention.

FIG. 20 is a perspective view showing another embodiment of rod holder 600 comprising a tubular receiver 602 for slidably receiving the handle of a fishing rod. The rearward portion of holder 602 is pivotably supported on the rearward portion of frame 605. The frame includes downwardly depending leg members 606 and 607 which can be slidably received in a suitable support stand (e.g., of the types shown in FIGS. 12 and 15). Fingers 608 and 609 are pivotally mounted on the forward portions of the frame and are connected by a cable 610.

The forward end of receiver 602 includes a forwardly projecting leg 603 which extends between fingers 608 and 609 and over cable 610. When a fish strikes a line connected to a fishing rod supported in receiver 602, downward movement of the rod causes leg 603 to be pushed downwardly against cable 610. This causes the upper ends of fingers 608 and 609 to tip towards each other to firmly grasp the fishing rod handle.

Figure 21:
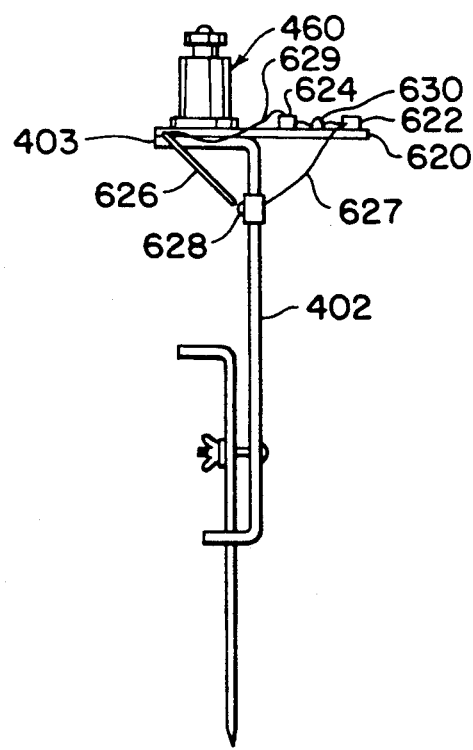
FIG. 21 is a side elevational view illustrating another embodiment of rod holder stand of the invention.

FIG. 21 is a side elevational view of another embodiment of portable stand which is useful in supporting a fishing rod holder. In this embodiment the stand of FIG. 10 further includes a plastic or other electrically insulating arm 620 secured between the upper end 403 and mounting block 460, as illustrated. An audible alarm and visual alarm system is carried on arm 620. The alarm system includes battery 622, LED 630 and a buzzer 624 which are connected in series. Contact arm 626 is carried by arm 620 and extends downwardly in close proximity to conductive band 628 carried on body 402. A wire 627 is connected between band 628 and battery 622. Wire 629 is connected between buzzer 624 and contact arm 626. When a fish strikes a line connected to a fishing rod supported by a holder attached to mounting block 460, downward movement of the fishing rod causes the upper end of body 402 to deflect slightly downwardly, whereby contact arm 626 touches band 628 and completes the circuit to activate the buzzer 624 and the LED 630.

Wing nuts shown throughout may be replaced with hex nuts or other suitable internally threaded fasteners. One can appreciate that rearward rod handle supports, forward rod handle supports, frame configurations, horizontal tilt-adjust mechanisms, and swivel strike indicators described herein may be interchangeable.

While certain representative embodiments and details have been shown for the purpose of illustrating the invention, it will be apparent to those skilled in this art that various modifications may be made to the invention without departing from the spirit or scope of the invention. Still other types of rod holder supports may be used in this invention. In one further embodiment, for example, rod holders of the type having two downwardly extending legs may be supported in a stand wherein opposing plates (with grooved faces or including friction surfaces) are mounted to opposite sides of an upstanding post. When the plates are tightened to the post (e.g., by means of a bolt passing transversely through the assembly) the plates are prevented from moving relative to the post. The legs of the rod holder are attached or received in appropriate openings in the top surfaces of the plates. By loosening the bolt, the plates (and thus the rod holder) can be tilted or rotated relative to the post.

What is claimed is:

1. A vertically adjustable stand for supporting a fishing rod holder, wherein said stand comprises:
    (a) an elongated strip member having upper and lower ends; wherein said upper end includes a ledge member and said lower end includes a lip member which is perpendicular to the longitudinal axis of said strip member; wherein said lip member includes openings therethrough; wherein said strip member has a non-circular cross-section;
    (b) two elongated leg members carried by said strip member and slidably received in said openings in said lip member; wherein said leg members are parallel to said strip member;
    (c) attachment means for securing said leg members to said strip member; wherein said attachment means comprises a bolt carried by said strip member for engaging said leg members;

(d) a step member secured to said leg members and extending outwardly from said leg members.

2. A stand in accordance with claim 1, further comprising a mounting block secured to said upper end of said strip member; wherein said mounting block comprises a cylindrical body which includes an annular recess.

3. A stand in accordance with claim 1, further comprising a mounting block secured to said upper end of said strip member; wherein said mounting block is rectangular in cross-section and includes openings extending therethrough.

4. A vertically adjustable stand for supporting a load, wherein said stand comprises:
   (a) an elongated body member having upper and lower ends; wherein said upper end includes a ledge member;
   (b) at least one elongated leg member carried by said body member;
   (c) attachment means for securing said leg member to said body member;
   (d) an alarm system comprising:
      (i) an electrically insulating plate member secured to said body member;
      (ii) battery means carried by said plate member;
      (iii) alarm means carried by said plate member;
      (iv) contact means carried by said body member;
      (v) a contact arm carried by said plate member and extending in close proximity to said contact means;
   wherein said battery means, alarm means, contact means and contact arm are connected in series in a manner such that when said contact arm makes electrical contact with said contact means said alarm means is activated to provide a signal.

5. A vertically adjustable stand for supporting a load, wherein said stand comprises:
   (a) an elongated body member having upper and lower ends; wherein said upper end includes a ledge member;
   (b) at least one elongated leg member carried by said body member;
   (c) attachment means for securing said leg member to said body member;
   (d) an elongated shank member having upper and lower ends; wherein said lower end of said shank member is tapered; wherein said upper end of said shank member includes a shelf portion which is perpendicular to the longitudinal axis of said shank member; wherein said shelf portion includes at least one opening for receiving said leg member; and further including a lip member extending downwardly from said shelf portion; wherein said lip member includes openings extending therethrough.

* * * * *